F. B. SWIGERT.
SAW FILING MACHINE.
APPLICATION FILED FEB. 8, 1913.
1,072,788.
Patented Sept. 9, 1913.
2 SHEETS—SHEET 1.
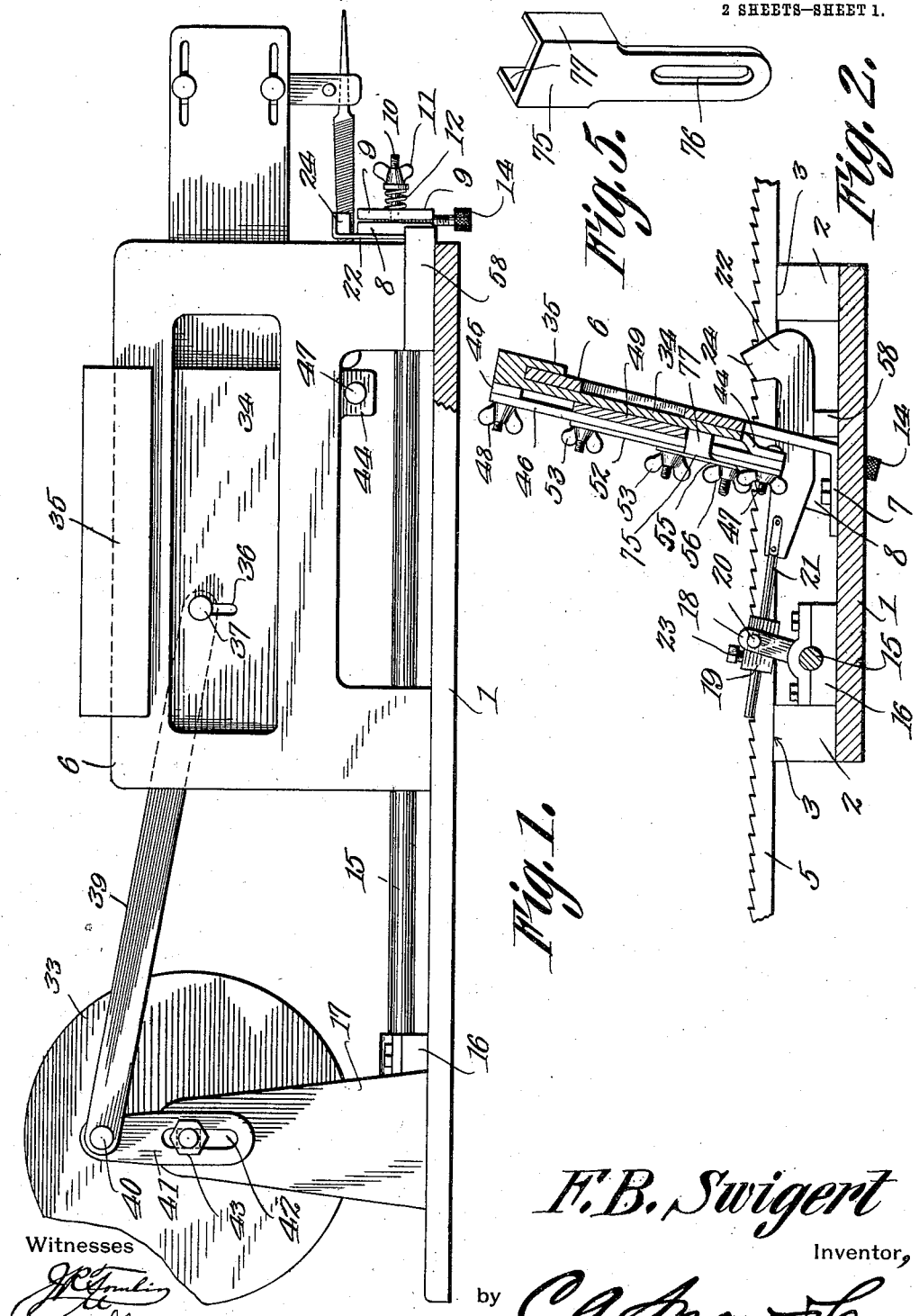
Witnesses
F. B. Swigert
Inventor,
by C. A. Snow & Co.
Attorneys.

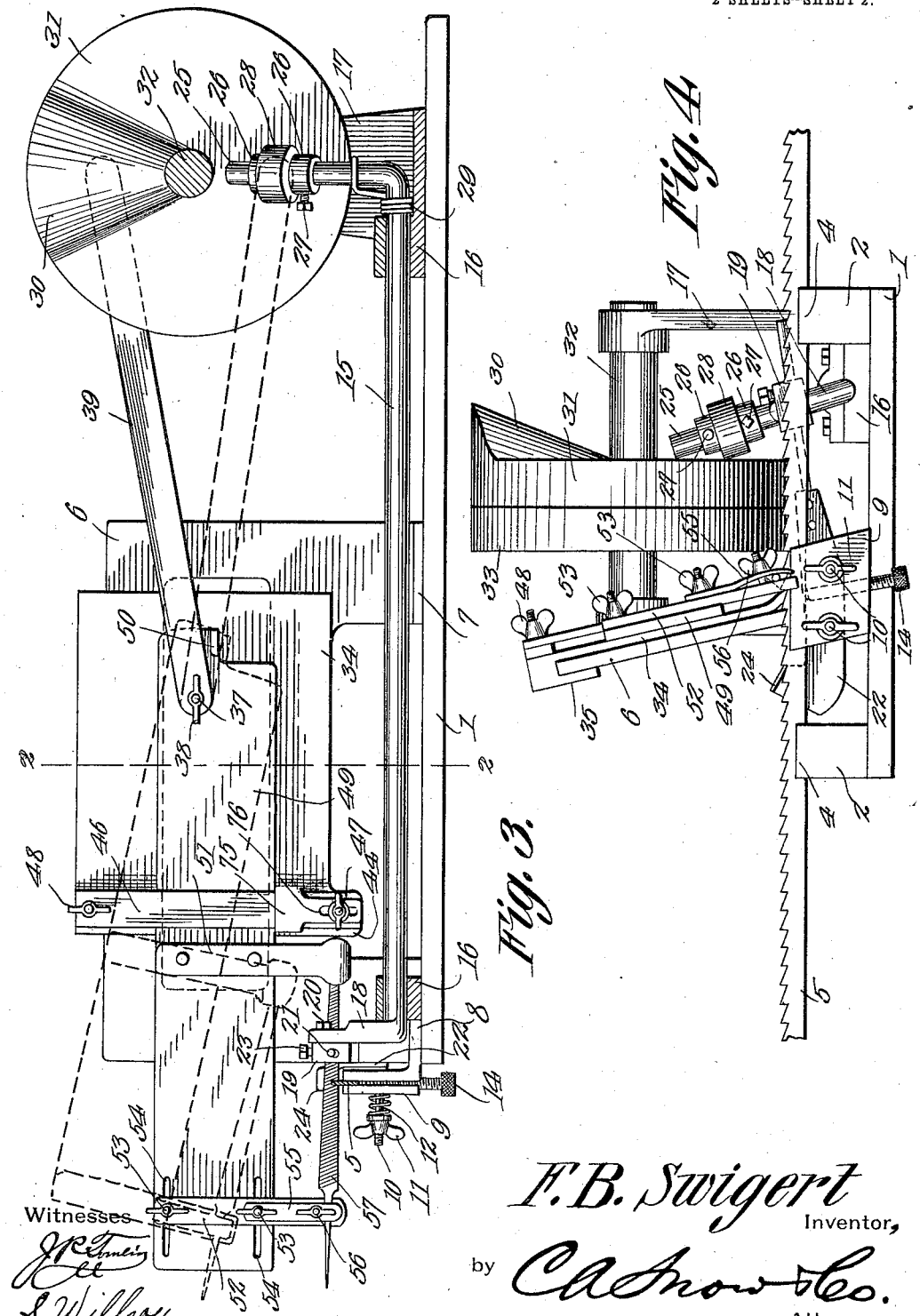

UNITED STATES PATENT OFFICE.

FREDRICK B. SWIGERT, OF GALESBURG, ILLINOIS.

SAW-FILING MACHINE.

1,072,788.  Specification of Letters Patent.  Patented Sept. 9, 1913.

Application filed February 8, 1913. Serial No. 747,189.

*To all whom it may concern:*

Be it known that I, FREDRICK B. SWIGERT, a citizen of the United States, residing at Galesburg, in the county of Knox and State of Illinois, have invented a new and useful Saw-Filing Machine, of which the following is a specification.

The device constituting the subject matter of this application is a machine adapted to be employed for filing saws.

One object of the present invention is to provide novel means for holding the saw against movement in the direction in which the file moves.

Another object of the invention is to provide novel means for advancing the saw transversely of the file.

The invention aims, further, to provide novel mechanism for actuating the file.

It is within the scope of the invention to improve generally and to increase the utility of, devices of that type to which the present invention appertains.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawing:—Figure 1 shows the invention in rear elevation, parts being broken away; Fig. 2 is a transverse section upon the line 2—2 of Fig. 3; Fig. 3 is a vertical longitudinal section, the major portions of the structure appearing in elevation; Fig. 4 is an end elevation; and Fig. 5 is a perspective of the depth gage.

The invention includes three coöperating mechanisms, to wit, the means for supporting the saw and for holding the saw against transverse movement while the same is being acted upon by the file; a mechanism for imparting step by step movement to the saw, so that the successive teeth of the saw may be positioned beneath the file; and a mechanism for reciprocating the file. These several component parts of the structure will be described in order, and as a preliminary statement, the device includes a base 1 upon which the coacting parts are supported.

*The saw supporting mechanism.*—Fixed to the base 1 adjacent one end of the base and located adjacent the longitudinal edges of the base are saw supporting blocks 2. Each block 2 is provided with a horizontal shoulder 3 and with an upstanding lip 4. The back or smooth edge of the saw 5 rests upon the horizontal shoulder 3 and one side face of the saw 5 slides along the lip 4, the saw 5 extending crosswise of the base 1 as shown to the best advantage in Fig. 4.

The invention further includes an upstanding, inclined guide 6 provided with laterally extended feet 7 which are secured to the base 1. The guide 6 constitutes no part of the saw holding mechanism, saving for the fact that one foot 7 of the guide may be provided with an angular abutment 8 as shown most clearly in Fig. 3. This abutment 8 coöperates with a clamp plate 9 which is supported upon a pair of threaded studs 10, the studs being mounted in the abutment 8. Wing nuts 11 are threaded on the ends of the studs 10 and springs 12 are compressed between the wing nuts and the clamp 9. The adjacent faces of the abutment 8 and of the clamp 9 are recessed and threaded to receive an adjusting screw 14.

The saw 5 is advanced longitudinally and slides along the shoulders 3 in abutment with the lips 4, the saw being frictionally held for sliding movement between the abutment 8 and the spring actuating clamp 9. The adjusting screw 14 may be regulated to support saws of different widths.

*The mechanism for advancing the saw* *longitudinally.*—Extended longitudinally of the base 1 is a rock shaft 15 journaled in bearings 16, one of which is secured to the base 1, the other of which is secured to the base and may constitute a part of a frame 17. At one end the shaft 15 is equipped with a crank arm 18 to which a block 19 is pivoted as indicated at 20. Slidably mounted in the block 19 is the stem 21 of a saw actuating pawl 22, the stem 21 being held in the block 19 by means of a set screw 23. The dropping movement of the free end of the pawl 22 may be limited by the stop 58 which is secured to the base 1 adjacent the guide 6, hereinbefore mentioned incidentally. The pawl 22 extends transversely of the base 1 and is equipped along its upper edge, at its free end, with an overhanging finger 24 which is adapted to engage the teeth of the saw 5.

At one end of the rock shaft 15, the same is equipped with a crank arm 25. Collars 26 are secured to the arm 25 by means of set screws 27, a roller 28 or like anti-friction element being journaled on the arm 25 between the collars 26. A spring 29 is engaged with the arm 25 and serves to swing the upper end of the arm 25 inwardly, so that the roller 28 will lie in the path of a cam 30, formed upon the side face of a pulley 31, the pulley 31 being secured to a shaft 32 which is journaled in the frame 17 and extends transversely of the base 1. Although the shaft 32 may be actuated in any desired manner, the pulley 31 may constitute means for imparting rotary movement to the shaft from a driving belt, and under such circumstances it may be desirable to mount a loose pulley 33 upon the shaft 32.

When the shaft 32 is rotated, the fixed pulley 31 will be rotated also, the cam 30 of which will engage with the roller 28, thereby imparting oscillatory movement to the shaft 15 through the medium of the arm 25. When the shaft 15 is oscillated, the arm 18 will swing transversely of the base 1, the pawl 22 pivoting upon the arm 18 at 19, and the lip 24 of the pawl engaging the teeth of the saw 5, to pull the saw transversely of the base 1, the lip 24 being inclined, so as to slide readily over the teeth of the saw when the pawl 22 is moved to the right in Fig. 2, thereby permitting the lip 24 to secure a hold upon another tooth of the saw. Through the operation of the mechanism last above described, a step by step movement will be imparted to the saw 5, the saw moving transversely of the base 1.

*The file holding and file operating mechanism.*—A carriage 34 lies against one side face of the inclined guide 6, the carriage being in the form of a plate having a flange 35 which hooks over the upper edge of the guide, to the end that the carriage may be supported for right line reciprocatory movement upon the guide. In the carriage 34 there is, as shown in Fig. 1, an upright slot 36, receiving a headed bolt 37 adjustably, the bolt 37 carrying a wing nut 38 engaging the carriage 34 so that the bolt may be held in adjusted positions in the slot 36 for a purpose to be described hereinafter. The bolt 37 constitutes a pivotal mounting for a pitman 39 which is pivoted as shown at 40 to one end of an arm 41 having a slot 42 adapted to receive a headed bolt 43 entering one end of the shaft 32. Adjacent one end, the carriage 34 is equipped with a depending extension 44 and upon the extension 44 and upon a spacing block 45 which is located adjacent the top of the carriage is mounted a guide 46, held in place by bolt and nut connections 47 and 48, the connections preferably being wing nut connections. A file holder 49, ordinarily taking the form of a flat plate, is mounted to slide between the guide 46 and the carriage 34, the file holder 49, intermediate its ends, being fulcrumed to swing upon the bolt 37 which constitutes, also, a connection with the pitman 39. A depth gage 75 is applied to the guide 46, the gage 75 being provided with a longitudinal slot 76, receiving the bolt and the wing nut connections 47. By this means, the gage 75 may be adjusted vertically. Adjacent its upper end, the gage 75 is provided with wings 77 which lie along the edges of the guide 46 and extend beneath the file holder 49. The depth gage 75 coöperates with the file holder 49, to limit the downward swinging movement thereof, thereby causing the file, hereinafter referred to, to strike at equal depth at each stroke. Adjacent one end, the file holder 49 is equipped with an outstanding shoulder 50 which lies beneath and in the path of the lower edge of the pitman 39. Secured to the file holder 49 and extending transversely thereof is a fixed file support 51, coöperating with a movable support 52, the same being provided with bolt and wing nut connections 53, adapted to move adjustably in slots 54 extended longitudinally of the file holder 49, adjacent the free end of the file holder. The lower bolt and wing nut connection 53 serves as a support for the upper end of a resilient clamp 55 held in place upon the member 52 by means of a bolt and wing nut connection 56. The butt of the file 57 is mounted removably in the lower end of the holder 51, the tang of the file being bound by means of the bolt and nut connection 56, between the clamp 55 and the lower end of the movable file support 52.

A reciprocatory movement is imparted to the file holder 49 and to the file 57 as follows:—When the shaft 32 is rotated, the pitman 39 will be actuated, the pitman 39 moving the carriage 34 to and fro and moving the file holder 49 and the file 57 to and fro, owing to the fact that the file holder 49 and the carriage 34 have a common pivotal connection with the pitman 39 at 38—37. An orbital movement is imparted to the file 57 by reason of the fact that when the pitman 39 is advanced, the lower edge of the pitman comes into contact with the shoulder 50 of the file holder 49, thus tilting the file holder 49 with the bolt 37, as a fulcrum. Thus, at the end of the forward stroke of the file 57, the file will be lifted off the saw, when the lower edge of the pitman 39 engages the shoulder 50.

*Operation.*—Although the operation of the structure has been dealt with hereinbefore in connection with the several constituent mechanisms, it will be understood that the shaft 32, through the medium of the arm 25 rocks the shaft 15, the arm 18 actuating the pawl 22 which, engaging the teeth of the saw, moves the saw longitudinally, so that the successive teeth come in vertical alinement with the file 57. The shaft 32 through the medium of the crank arm 41 actuates the pitman 39, the pitman 39 sliding the carriage 34 and the file holder 49 to and fro, so that, upon the forward, stroke, the file 57 will engage and sharpen the teeth of the saw. When the cutting stroke of the file 57 has been completed, the lower edge of the pitman 39 will engage the shoulder 50 and tilt the file holder 49 so that the file does not engage the teeth of the saw 5, upon the backstroke of the file.

*Adjustments.*—By manipulating the adjusting screw 14, the saws of different widths may be accommodated. In order to adapt the machine for use in connection with saws having teeth of different widths, the roller 28 may be shifted up and down the arm 25 by moving the collars 26 and thus the throw of the arm 25 and the arc in which the rock shaft 15 moves may be regulated, so that the arm 18 and the pawl 22 will make a long or a short stroke, depending upon the length of the slant faces of the teeth of the saw 5. The position of the lip 24 of the pawl 22 with respect to the file 57 may be adjusted by loosening the set screw 23 in the block 19 and by shifting the stem 21 of the pawl, it being possible, by this adjustment, to bring the edge of the lip 24 in abutment with the upright edge of one tooth of the saw 5 after the position of the roller 28 with respect to the cam 30 has been adjusted. The slots 54 in the file holder 49 permit the movable file support 52 to be moved so that files of different lengths may be accommodated. The throw of the pitman 39, and consequently the length of the stroke accomplished by the file 57 may be regulated by moving the crank arm 41 transversely of the bolt 43, the slot 42 in the crank arm permitting this adjustment. The file 57 may be made to stand level during its cutting stroke, by adjusting the bolt and wing nut connection 37—38 in the slot 36 of the carriage 34.

Having thus described the invention, what is claimed is:—

1. In a saw filing machine, a guide; a carriage mounted to slide upon the guide; a file holder fulcrumed upon the carriage; a pitman pivoted to the carriage; means for actuating the pitman; and interengaging elements upon the holder and upon the pitman for tilting the holder.

2. In a saw filing machine, a guide; a carriage mounted to slide up on the guide; a file holder fulcrumed intermediate its ends upon the carriage and provided adjacent one end with a shoulder; a pitman pivoted to the carriage and adapted to engage the shoulder; means for actuating the pitman; and means for moving the saw transversely of the line of movement of the carriage.

3. In a saw filing machine, a guide; a carriage mounted to slide upon the guide; a file holder fulcrumed on the carriage; a pitman pivoted to the carriage; means for actuating the pitman; interengaging elements upon the holder and upon the pitman for tilting the holder; and a pair of file supports mounted upon the file holder, one of which supports is adjustable longitudinally of the file holder.

4. In a saw filing machine, a guide; a carriage mounted to slide on the guide; a file holder; means for pivotally connecting the file holder with the carriage adjustably for movement transversely of the carriage to permit a leveling of the file holder; means for actuating the carriage; and interengaging elements upon said means and upon the file holder for imparting a swinging movement to the file holder.

5. In a saw filing machine, a guide; a carriage mounted to slide on the guide; a pitman; a file holder; a common connection between the pitman, carriage and the holder, permitting a pivotal movement of the pitman and the holder with respect to the carriage, the connection being adjustable transversely of the carriage to effect a leveling of the file holder; and interengaging elements upon the pitman and upon the file holder for imparting swinging movement to the file holder.

6. In a saw filing machine, a guide; a carriage mounted to slide upon the guide; a file holder pivoted to the carriage; a pitman pivotally connected with the carriage to advance and to retract the carriage; interengaging elements on the pitman and on the file holder for lifting the file holder; a crank shaft with which the pitman is connected; a rock shaft journaled adjacent the guide and provided with radial arms; mechanism operatively connected with the crank shaft and engaging one of said arms; and a saw engaging pawl operatively connected with the other of said arms and movable transversely of the line of movement of the carriage.

7. In a device of the class described, a supporting structure; a shaft journaled thereon and provided with a cam; a rock shaft journaled on the supporting structure upon one side of the cam and provided with an arm coöperating directly with the cam; a pawl pivotally connected with the rock shaft eccentrically of the rock shaft; a file holder; and means located upon the other side of the cam for operatively connecting the file holder with the first specified shaft.

8. In a saw filing machine, a guide; a carriage mounted to slide upon the guide; a file holder fulcrumed on the carriage; means for sliding the carriage; means for tilting the file holder; and a depth gage adjustable on the carriage transversely of the line of travel of the carriage, the gage lying in the path of the holder.

9. In a saw filing machine, a guide; a carriage mounted to slide upon the guide; a file holder fulcrumed on the carriage; means for sliding the carriage; means for tilting the file holder; means for adjusting the file holder upon the carriage to effect a leveling of the file holder; and a depth gage adapted to engage the file holder and mounted on the carriage for movement transversely of the line of movement of the carriage.

10. In a saw filing machine, a guide; a carriage mounted to slide upon the guide; a file holder fulcrumed on the carriage; a second guide secured to the carriage and constituting means for directing the tilting movement of the file holder upon the carriage; a depth gage mounted upon the last specified guide and adapted to engage the file holder; means for tilting the file holder; and means for sliding the carriage.

In testimony that I claim the foregoing as my own, I have hereto affixed my signature in the presence of two witnesses.

FREDRICK B. SWIGERT.

Witnesses:
C. W. WALKER,
SELMA R. FAGERLUND.

Copies of this patent may be obtained for five cents each, by addressing the "Commissioner of Patents, Washington, D. C."